(12) United States Patent
Cho

(10) Patent No.: US 8,869,060 B2
(45) Date of Patent: Oct. 21, 2014

(54) METHOD AND APPARATUS FOR DISPLAYING TRANSLUCENT POP-UP INCLUDING ADDITIONAL INFORMATION CORRESPONDING TO INFORMATION SELECTED ON TOUCH SCREEN

(75) Inventor: Tae-gyun Cho, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 35 days.

(21) Appl. No.: 13/086,058

(22) Filed: Apr. 13, 2011

(65) Prior Publication Data

US 2011/0271222 A1   Nov. 3, 2011

(30) Foreign Application Priority Data

May 3, 2010   (KR) .................. 10-2010-0041444

(51) Int. Cl.
*G06F 3/048* (2013.01)
*G06F 3/0481* (2013.01)
*G06F 3/0488* (2013.01)

(52) U.S. Cl.
CPC .... *G06F 3/0481* (2013.01); *G06F 2203/04804* (2013.01); *G06F 3/04886* (2013.01)
USPC ........................................ 715/773; 715/808

(58) Field of Classification Search
CPC ........ G06F 3/048; G06F 3/017; G06F 3/0484
USPC .................. 715/773, 708, 711, 805, 810, 808
See application file for complete search history.

(56) References Cited

U.S. PATENT DOCUMENTS

| 5,651,107 | A  | * | 7/1997  | Frank et al. ................... 715/768 |
| 2003/0160830 | A1 | * | 8/2003  | DeGross ....................... 345/808 |
| 2004/0141016 | A1 | * | 7/2004  | Fukatsu et al. ................ 345/856 |
| 2006/0161871 | A1 | * | 7/2006  | Hotelling et al. ............. 715/863 |
| 2006/0242607 | A1 | * | 10/2006 | Hudson ........................ 715/863 |
| 2007/0132789 | A1 | * | 6/2007  | Ording et al. ................. 345/684 |
| 2008/0122796 | A1 | * | 5/2008  | Jobs et al. ..................... 345/173 |
| 2009/0006956 | A1 | * | 1/2009  | Bae et al. ...................... 715/708 |
| 2009/0228831 | A1 | * | 9/2009  | Wendker et al. ............. 715/808 |

* cited by examiner

*Primary Examiner* — William Bashore
*Assistant Examiner* — Jeanette J Parker
(74) *Attorney, Agent, or Firm* — Staas & Halsey LLP

(57) ABSTRACT

A method of displaying a translucent pop-up including additional information corresponding to information selected on a touch screen includes receiving a first touch input for selecting first information on the touch screen; displaying a first translucent pop-up including first additional information corresponding to the first information; receiving a second touch input for selecting second information located in a region of the first translucent pop-up, on the touch screen; and displaying a second translucent pop-up including second additional information corresponding to the second information.

18 Claims, 11 Drawing Sheets

FIG. 3

| Window ID | Member 1 | Member 2 | Member 3 | Member 4 | Member 5 |
|---|---|---|---|---|---|
| 1 | button 1 | button 2 | button 3 | button 4 | button 5 |
| 2 | button 6 | button 7 | Box 1 | Box 2 | Box 3 |
| 3 | button 8 | button 9 | Box 4 | Table 1 | Table 2 |

FIG. 4

| Member | Top Left | Bottom Right |
|---|---|---|
| button 1 | (10, 10) | (20, 20) |
| button 2 | (50, 50) | (150, 100) |
| button 3 | (10, 11) | (20, 21) |
| button 4 | (10, 12) | (20, 22) |
| Table 1 | (10, 13) | (20, 23) |
| Table 2 | (10, 14) | (20, 24) |
| Box 1 | (10, 15) | (20, 25) |

FIG. 6

| MEMBER | HELP CONTENT |
|---|---|
| BUTTON 1 | THIS FUNCTION OPTIMIZES IMAGE BASED ON TEXT |
| BUTTON 2 | THIS FUNCTION OPTIMIZES IMAGE BASED ON TEXT AND PHOTO |
| BUTTON 3 | THIS FUNCTION OPTIMIZES IMAGE BASED ON MAGAZINE |

FIG. 8

| Window ID | Member 1 | Member 2 | Member 3 | Member 4 | Member 5 | Member 6 | Member 7 | Member 8 |
|---|---|---|---|---|---|---|---|---|
| 1 | button 1 | button 2 | button 3 | button 4 | button 5 | Pop Up 1 | Pop Up 2 | Pop Up 3 |
| 2 | button 6 | button 7 | Box 1 | Box 2 | Box 3 | Pop Up 4 | Pop Up 5 | Pop Up 6 |
| 3 | button 8 | button 9 | Box 4 | Table 1 | Table 2 | Pop Up 7 | Pop Up 8 | Pop Up 9 |

| Member | Left Top | Right Bottom | Activated |
|---|---|---|---|
| Pop Up 1 | (15, 12) | (25, 22) | Yes |
| Pop Up 2 | (18, 14) | (28, 24) | No |
| Pop Up 3 | (21, 16) | (31, 26) | Yes |

METHOD AND APPARATUS FOR DISPLAYING TRANSLUCENT POP-UP INCLUDING ADDITIONAL INFORMATION CORRESPONDING TO INFORMATION SELECTED ON TOUCH SCREEN

CROSS-REFERENCE TO RELATED APPLICATIONS

This application claims the priority benefit of Korean Patent Application No. 10-2010-0041444, filed on May 3, 2010, in the Korean Intellectual Property Office, the disclosure of which is incorporated herein in its entirety by reference.

BACKGROUND

1. Field

An embodiment relates to a method and apparatus for displaying a translucent pop-up including additional information corresponding to information selected on a touch screen.

2. Description of the Related Art

Some apparatuses set a function or receive information when a user touches a graphical user interface (GUI) of a touch screen, without requiring a user to use any additional input device. These apparatuses may display additional information corresponding to a set function or input information by using a pop-up on an entire screen or a sub screen. If additional information is displayed on a pop-up covering an entire screen, a GUI on the screen is completely covered by the pop-up. Otherwise, if additional information is displayed on a pop-up covering a sub screen of a screen, a function setup option of a GUI of the screen located in the same region as the pop-up is covered by the pop-up. If a function setup option is covered by a pop-up, the function option setup may not be checked or selected. Accordingly, in order to check or select the function setup option, the pop-up may have to be manually closed first. Even if additional information is displayed by using a translucent pop-up, a function setup option located in the same region as the translucent pop-up may be checked but the translucent pop-up may still have to be manually closed to select the function setup option. Accordingly, a solution for selecting a function setup option located in the same region as a pop-up without manually closing the pop-up is required.

SUMMARY

An aspect provides a method and apparatus for displaying a translucent pop-up including additional information corresponding to information located in the same region as an already displayed translucent pop-up without manually closing the already displayed translucent pop-ups.

According to an aspect, there is provided a method of displaying a translucent pop-up including additional information corresponding to information selected on a touch screen, the method including receiving a first touch input for selecting first information on the touch screen; displaying a first translucent pop-up including first additional information corresponding to the first information; receiving a second touch input for selecting second information located in a region of the first translucent pop-up, on the touch screen; and displaying a second translucent pop-up comprising second additional information corresponding to the second information.

According to another aspect, there is provided a computer readable recording medium having recorded thereon a computer program for executing a method of displaying a translucent pop-up including additional information corresponding to information selected on a touch screen.

According to another aspect, there is provided an apparatus for displaying a translucent pop-up including additional information corresponding to information selected on a touch screen, the apparatus including a display unit to display a graphical user interface (GUI) and a translucent pop-up; an input unit for receive a first touch input to select first information and a second touch input to select second information located in a region of the displayed translucent pop-up, on the displayed GUI; a storage to store additional information corresponding to each of a plurality of types of information; an information extraction unit to extract first additional information corresponding to the selected first information and second additional information corresponding to the selected second information, from the storage; a translucent pop-up generation unit to generate a first translucent pop-up including the extracted first additional information and a second translucent pop-up including the extracted second additional information; and a control unit to control the display unit to display the generated first and second translucent pop-ups.

BRIEF DESCRIPTION OF THE DRAWINGS

The above and other features and advantages of an embodiment will become more apparent by describing in detail exemplary embodiments thereof with reference to the attached drawings in which:

FIG. 3 is a table showing members for constructing a GUI, according to an embodiment;

FIG. 4 is a table showing coordinates of members of a GUI, according to an embodiment;

FIG. 6 is a table showing help contents stored in a storage for all members of a GUI, according to an embodiment;

FIG. 8 is a table showing a case when members displayed on a GUI include pop-ups, according to an embodiment;

DETAILED DESCRIPTION

Hereinafter, embodiments will be described in detail by explaining the embodiments with reference to the attached drawings.

Figure 1:
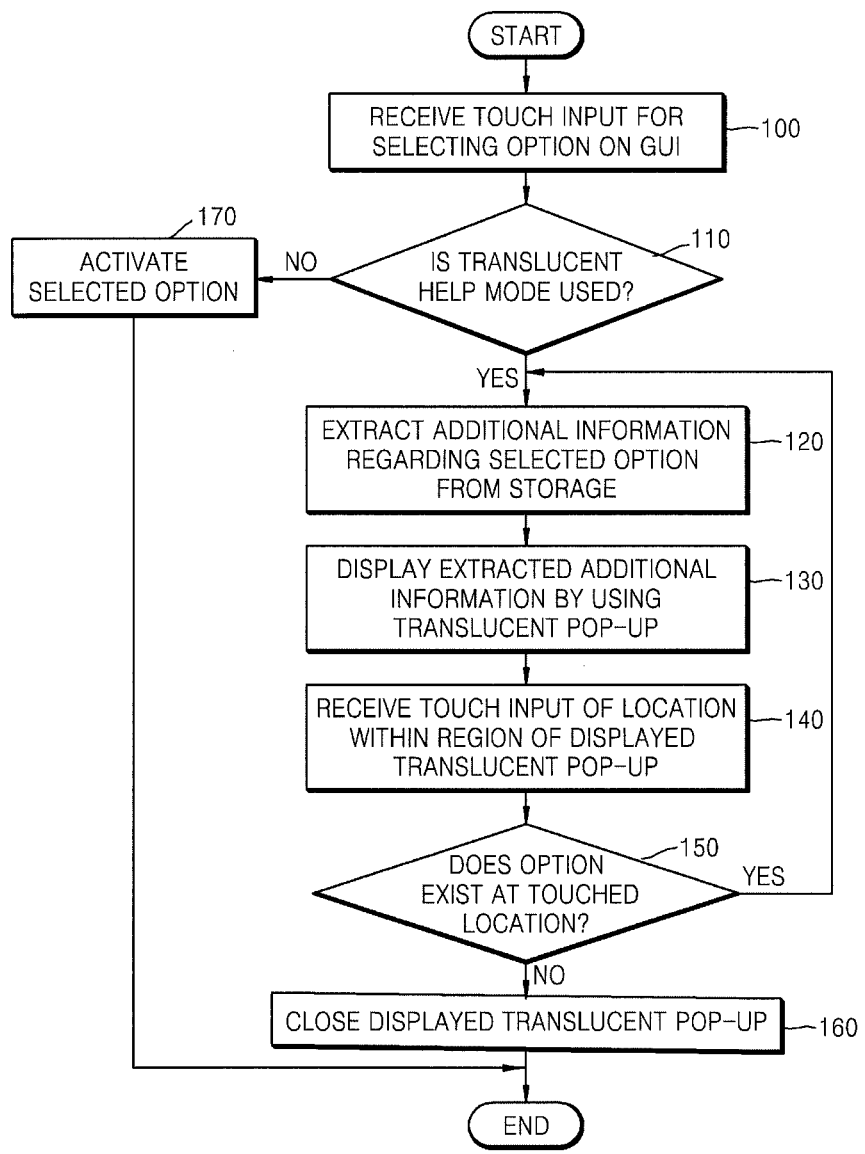
FIG. 1 is a flowchart of a method of displaying a pop-up including additional information corresponding to information selected on a touch screen, according to an embodiment.

FIG. 1 is a flowchart of a method of displaying a pop-up including additional information corresponding to information selected on a touch screen, according to an embodiment.

Referring to FIG. 1, in operation 100, a touch input for selecting an option on a graphical user interface (GUI) of the touch screen is received.

Figure 2:
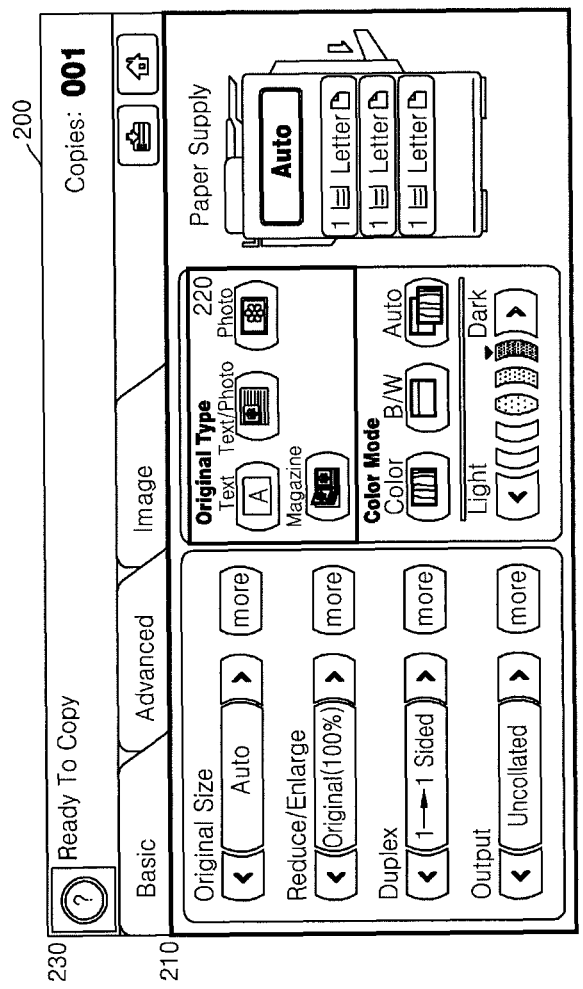
FIG. 2 is a diagram of a graphical user interface (GUI) displayed on a touch screen, according to an embodiment.

FIG. 2 is a diagram of a GUI 200 displayed on a touch screen, according to an embodiment. Referring to FIG. 2, the GUI 200 includes a function manipulation unit 210 for manipulating various functions of an image forming apparatus that displays the GUI 200, an option setup unit 220 included in the function manipulation unit 210 and for setting an option of each function, and a help manipulation unit 230 for displaying additional information regarding the set option. In general, a user may manipulate a desired function of the image forming apparatus by using the function manipulation unit 210, may set a detailed option of each function by using the option setup unit 220, and may check additional information regarding the set option by using the help manipulation unit 230 if the additional information is desired. Also, according to an embodiment, all icons of the function manipulation unit 210, the option setup unit 220, and the help manipulation unit 230 for constructing the GUI 200 of the touch screen may be members of the GUI 200. Also, members of the GUI 200 are located in regions of the GUI 200 and the regions may be represented by coordinates. Although only buttons are illustrated in FIG. 2 as members for constructing the GUI 200, in addition to buttons, tables and boxes may also be members of the GUI 200. Here, a button has a predetermined value and inputs its value when the button is touched, a table has values that correspond to items and, when one of the items is touched, inputs the value corresponding to the touched item, and a box inputs a value input by a user.

FIG. 3 is a table showing members for constructing a GUI, according to an embodiment. Referring to FIG. 3, the GUI displayed on one screen has a unique "WINDOW ID" and each "WINDOW ID" sets types of all members displayed on the GUI. In this case, the members are buttons, tables, and boxes. For example, if the GUI 200 illustrated in FIG. 2 has a "Window ID" of "1", the GUI 200 has buttons 1 through 5 as members and the buttons correspond to icons displayed on the GUI 200. For example, in an "Original Type" function of the GUI 200, the button 1 may correspond to a "Text" icon, the button 2 may correspond to a "Text/Photo" icon, the button 3 may correspond to a "Photo" icon, and the button 4 may correspond to a "Magazine" icon.

FIG. 4 is a table showing coordinates of members of a GUI, according to an embodiment. Referring to FIG. 4, all of the members displayed on the GUI are located in regions of the GUI. In this case, as illustrated in FIG. 4, a region in which a member is located may be represented by a coordinate value at a top left corner of the member and a coordinate value at a bottom right corner of the member. However, the embodiment is not limited thereto and the region may also be represented by using another method.

Also, a coordinate of a location on a touch screen touched by a user may be obtained. In this case, the touch screen may include a touch sensor for sensing the touched location. A touch panel of the touch screen may be, for example, a resistive film type, an optical type, a capacitive type, an ultrasonic type, or a piezoelectric type. For example, if the touch panel is a piezoelectric type, the touch panel is constructed by forming a transparent piezoelectric plate including piezoelectric cells that are tightly disposed in the form of a grid, on a display unit. If a user touches a location within a region of the GUI, a coordinate of the touched location may be recognized by horizontal and vertical lines of a piezoelectric cell at the touched location by using an electrical signal generated by the piezoelectric cell, and thus the coordinate of the touched location may be obtained.

Accordingly, an option at the touched location may be selected by determining whether the coordinate of the touched location is included in a region of a member of the GUI. For example, in the "Original Type" function of the GUI 200 illustrated in FIG. 2, if a location corresponding to the "Text" icon is touched, a coordinate of the touched location is included in a region of the "Text" icon and thus the "Text" icon may be selected.

Referring back to FIG. 1, in operation 110, it is determined whether to use a translucent help mode. Here, the translucent help mode refers to a mode in which a translucent pop-up is used if additional information is displayed by using a pop-up. According to an embodiment, setting of the translucent help mode is not essential. The translucent help mode is used for convenience of users who require additional information. Since displaying of additional information may be inconvenient for users who are already sufficiently aware of content regarding the set option, the translucent help mode may be used or may not be used according to a user's needs.

Figure 5:
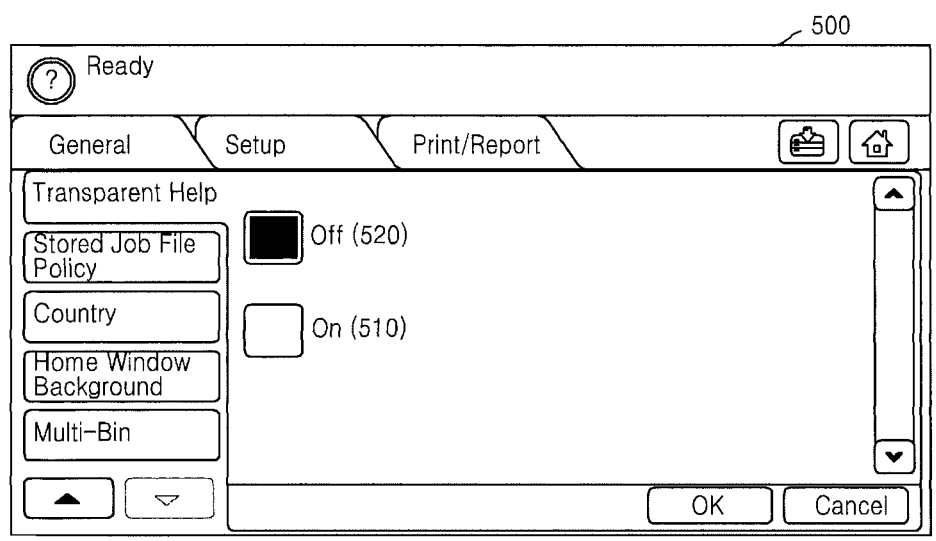
FIG. 5 is a diagram showing a menu for determining whether to use a translucent help mode, according to an embodiment.

FIG. 5 is a diagram showing a menu 500 for determining whether to use a translucent help mode, according to an embodiment. Referring to FIG. 5, it may be determined whether to use the translucent help mode or not by selecting an "On" button 510 or an "Off" button 520 in the menu 500. A value set on the menu 500 is stored in a storage (not shown). Accordingly, it is determined whether to use the translucent help mode by checking the value stored in the storage. If the translucent help mode is used, the method illustrated in FIG. 1 proceeds to operation 120. Otherwise, the method proceeds to operation 170.

Referring back to FIG. 1, in operation 120, additional information regarding the selected option is extracted from a storage. According to an embodiment, the storage stores help contents for all options and one of the help contents is used as the additional information regarding the selected option. Accordingly, the additional information regarding the selected option may be extracted from the storage.

FIG. 6 is a table showing help contents stored in a storage for all members of a GUI, according to an embodiment. Since the members are displayed on the GUI in the form of, for example, buttons, tables, and boxes, the storage stores help contents corresponding to the buttons, the tables, and the boxes. Here, the buttons, the tables, and the boxes may refer to options of a function. Since options may be formed as buttons according to an embodiment, help contents corresponding to the buttons are stored in FIG. 6. For example, if a button 1 corresponds to the option selected in operation 120 illustrated in FIG. 1, a help content regarding the button 1 is extracted.

Referring back to FIG. 1, in operation 130, the extracted additional information is displayed by using a translucent pop-up.

Figure 7:
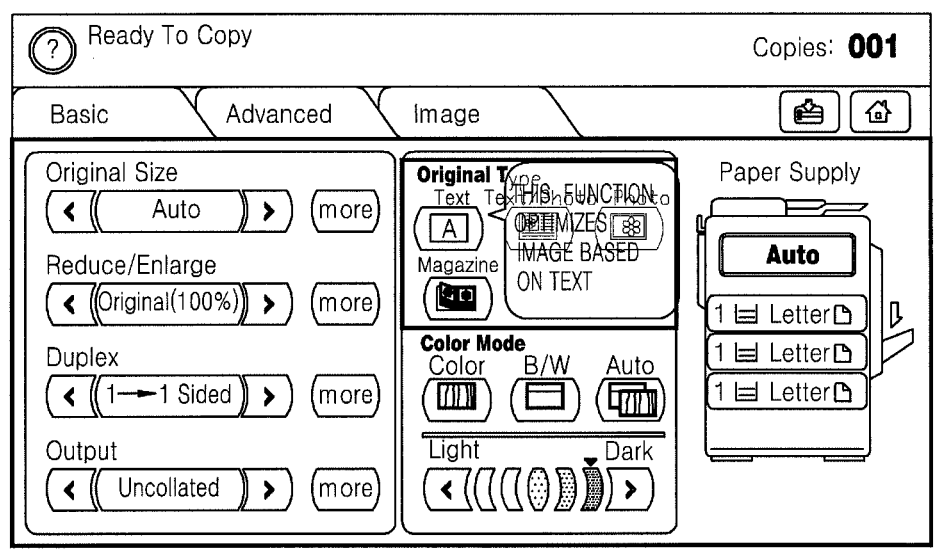
FIG. 7 is a diagram showing additional information displayed by using a translucent pop-up, according to an embodiment.

FIG. 7 is a diagram showing additional information displayed by using a translucent pop-up, according to an embodiment. Referring to FIG. 7, additional information regarding a selected option may be displayed on a GUI by using a translucent pop-up on a sub screen in the form of a speech bubble. Since the additional information is displayed by using the translucent pop-up, a user may check an option of the GUI located in the same region as the translucent pop-up. Although the translucent pop-up has a speech bubble shape in FIG. 7, the translucent pop-up is not limited thereto and may have a different shape and size.

Referring back to FIG. 1, in operation 140, a touch input corresponding to a location within a region of the displayed translucent pop-up is received. As illustrated in FIG. 3, all icons displayed on the GUI may be members of the GUI. Pop-ups displayed on the GUI may also be members of the GUI.

FIG. 8 is a table showing a case when members displayed on a GUI include pop-ups, according to an embodiment. Referring to FIG. 8, in addition to the members illustrated in FIG. 3, pop-ups may be added as new members. As such, coordinates of regions in which the pop-ups are located may also be represented.

Figures 9, 10:
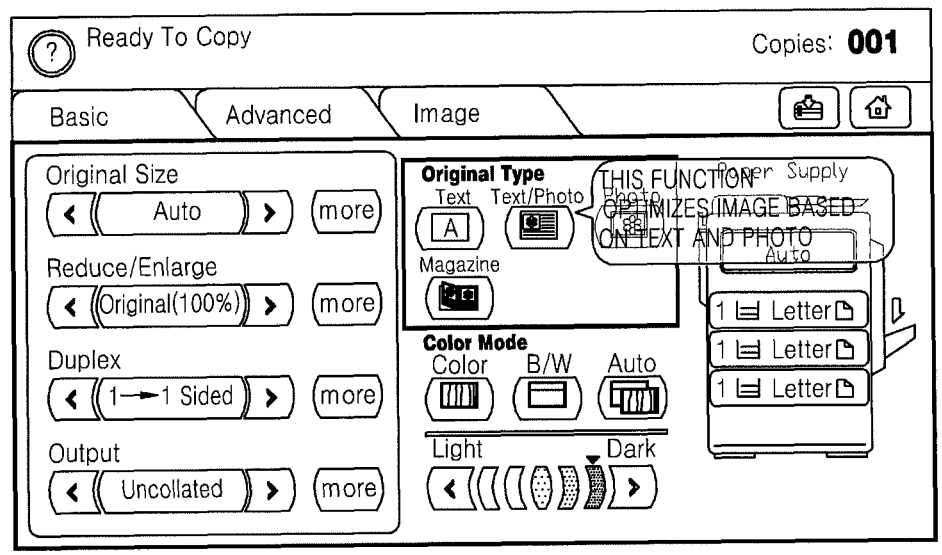
FIG. 9 is a table showing coordinates of pop-ups on a GUI, according to an embodiment.
FIG. 10 is a diagram showing a pop-up displayed when a touch input for selecting an option located in a region of an already displayed pop-up is received, according to an embodiment.

FIG. 9 is a table showing coordinates of pop-ups on a GUI, according to an embodiment. Referring to FIG. 9, all pop-ups displayed on the GUI are located in regions of the GUI. In this case, as illustrated in FIG. 9, a region in which a pop-up is located may be represented by a coordinate value at a top left corner of the pop-up and a coordinate value at a bottom right corner of the pop-up. Also, since the pop-up is not a constant member but a temporary member on the GUI, the coordinate of the pop-up is valid only when the pop-up is "Activated". Here, the pop-up is "Activated" when the pop-up is displayed on the GUI.

Referring back to FIG. 1, in operation 150, it is determined whether an option exists at the touched location. As illustrated in FIG. 7, the region of the translucent pop-up includes the "Text/Photo" icon and the "Photo" icon. Accordingly, it is determined whether the touched location corresponds to a region of the "Text/Photo" icon or the "Photo" icon. It may be determined whether an option exists at the touched location, by checking whether a coordinate of the touched location is included in a region of an option. If it is determined that an option exists at the touched location, the method proceeds to operation 120. Otherwise, the method proceeds to operation 160.

If the method proceeds to operation 120, additional information regarding the touched location is extracted and then is displayed by using a translucent pop-up. In this case, the translucent pop-up that is already displayed on the GUI may be closed. If a new pop-up is additionally displayed when an already displayed pop-up exists on the GUI, the two displayed pop-ups may cause confusion and thus the already displayed pop-up may be closed to display the new pop-up.

FIG. 10 is a diagram showing a pop-up displayed when a touch input for selecting an option located in a region of an already displayed pop-up is received, according to an embodiment. Referring to FIG. 10, if a touch input for selecting an option located in the region of the displayed pop-up is received, instead of the already displayed pop-up, a pop-up including additional information regarding the newly selected option is displayed. Accordingly, a user may display a translucent pop-up including additional information regarding the option located in the region of the already displayed translucent pop-up without manually closing the already displayed translucent pop-up.

Referring back to FIG. 1, in operation 160, the displayed translucent pop-up is closed. In operation 170, the selected option is activated.

Figure 11:
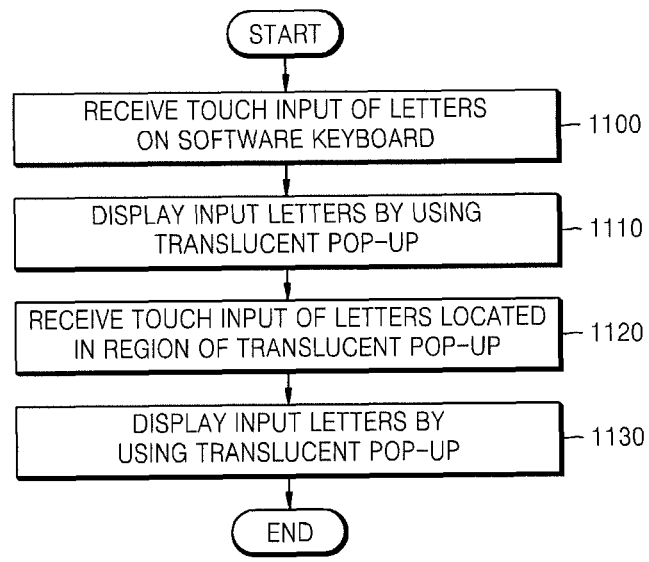
FIG. 11 is a flowchart of a method of displaying a pop-up including additional information corresponding to information selected on a touch screen, according to another embodiment.

FIG. 11 is a flowchart of a method of displaying a pop-up including additional information corresponding to information selected on a touch screen, according to another embodiment.

Referring to FIG. 11, in operation 1100, a touch input of letters on a software keyboard is received.

Figure 12:
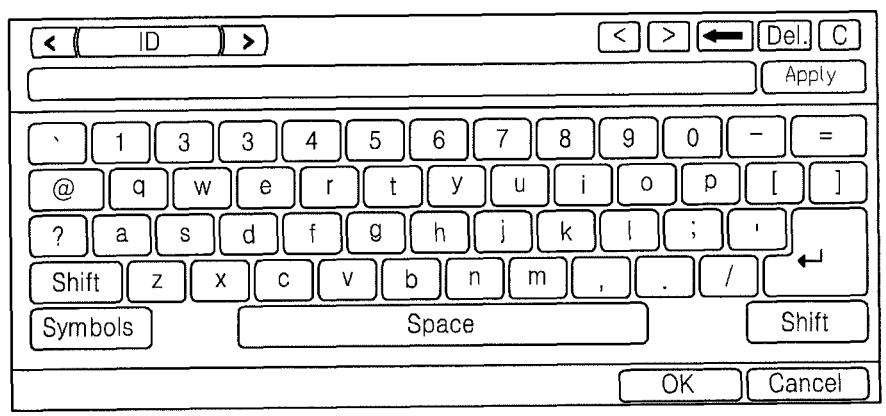
FIG. 12 is a diagram of a software keyboard according to an embodiment.

FIG. 12 is a diagram of a software keyboard according to an embodiment. Referring to FIG. 12, the software keyboard is realized on a touch screen and a user may input letters by touching the letters.

Referring back to FIG. 11, in operation 1110, the input letters are displayed by using a translucent pop-up. For example, if a touch input of "f", "g", and "h" is input using the software keyboard illustrated in FIG. 12, an input "fgh" may correspond to additional information that represents information input by a user. Accordingly, "fgh" is displayed by using the translucent pop-up.

Figure 13:
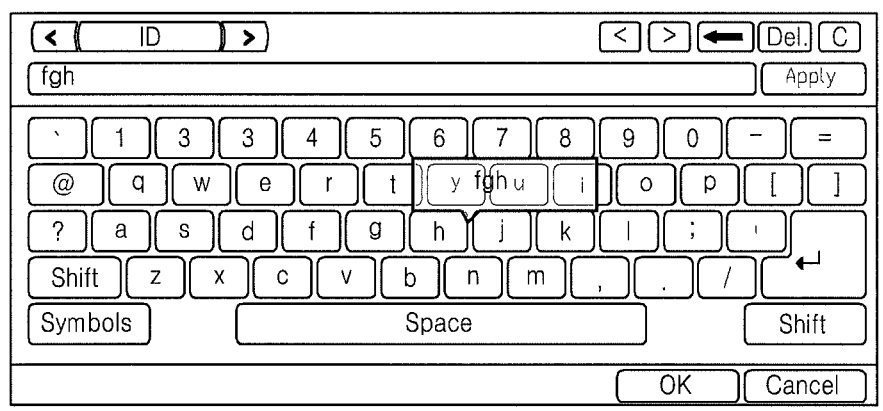
FIG. 13 is a diagram showing a translucent pop-up for displaying letters of a software keyboard, according to an embodiment.

FIG. 13 is a diagram showing a translucent pop-up for displaying letters of a software keyboard, according to an embodiment. Referring to FIG. 13, an input "fgh" is displayed by using the translucent pop-up.

Referring back to FIG. 11, in operation 1120, a touch input of letters located in a region of the translucent pop-up is received. For example, in FIG. 13, "y", "u", and "i" are located in the region of the translucent pop-up. Accordingly, a touch input of "y", "u", and "i" may be received. For example, a touch input of "y", "y", and "u" may be received.

In operation 1130, the input letters are displayed by using a translucent pop-up. For example, if "y", "y", and "u" are input, since continuous inputs of letters correspond to additional information corresponding to input information, "yyu" is displayed by using the translucent pop-up. In this case, an already displayed pop-up may be closed and a new pop-up may be displayed.

Figure 14:
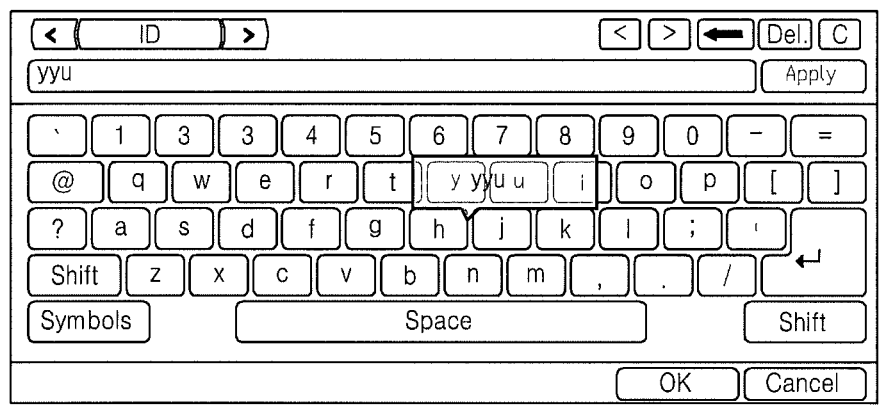
FIG. 14 is a diagram showing a translucent pop-up displayed when a touch input of letters located in a region of an already displayed translucent pop-up is received, according to an embodiment.

FIG. 14 is a diagram showing a translucent pop-up displayed when a touch input of letters located in a region of an already displayed translucent pop-up is received, according to an embodiment. Referring to FIG. 14, since a touch input of "y", "y", and "u" is received using letters located in the region of the already displayed translucent pop-up, "yyu" is displayed by using a translucent pop-up.

Figure 15:
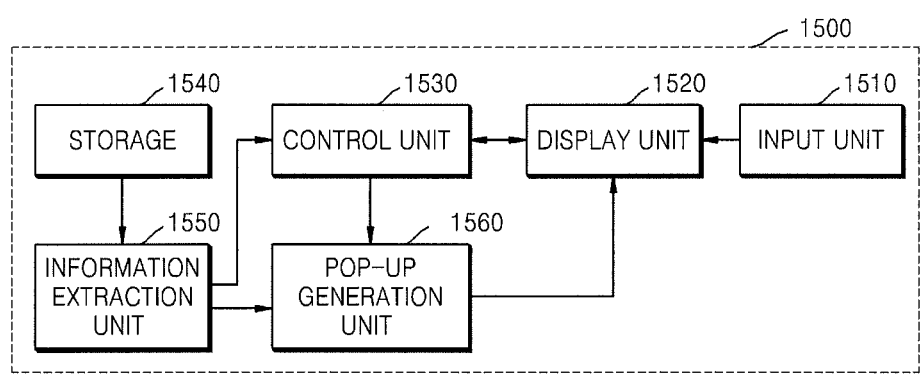
FIG. 15 is a block diagram of an apparatus for displaying a pop-up including additional information corresponding to information selected on a touch screen, according to an embodiment.

FIG. 15 is a block diagram of an apparatus 1500 for displaying a pop-up including additional information corresponding to information selected on a touch screen, according to an embodiment.

Referring to FIG. 15, the apparatus 1500 includes an input unit 1510, a display unit 1520, a control unit 1530, a storage 1540, an information extraction unit 1550, and a pop-up generation unit 1560.

If a body part of a user or an object provides a touch input for selecting a region on a GUI displayed on the display unit 1520, the input unit 1510 checks a coordinate of a location of the touch input and transmits the coordinate as location information of the selected region to the control unit 1530.

The input unit 1510 may be a touch screen including a touch sensor connected to the display unit 1520 and may sense a location touched by a user. A touch panel of the touch screen may be, for example, a resistive film type, an optical type, a capacitive type, an ultrasonic type, or a piezoelectric type. For example, if the touch screen is a piezoelectric type, the touch panel is constructed by forming a transparent piezoelectric plate including piezoelectric cells that are tightly disposed in the form of a grid, on the display unit 1520. If a user touches a location within a region of the GUI, a coordinate of the touched location may be recognized by horizontal and vertical lines of a piezoelectric cell at the touched location by using an electrical signal generated by the piezoelectric cell, and thus the coordinate of the touched location may be obtained.

The display unit 1520 displays various GUIs or a software keyboard.

The control unit 1530 controls operations of the display unit 1520, the storage 1540, and the pop-up generation unit 1560.

The storage 1540 stores a setup value of a translucent help mode, information regarding members of GUIs, coordinate information of the members, additional information regarding the members, and location information of pop-ups. The information regarding the members may be as illustrated in FIG. 3, the coordinate information of the members may be as illustrated in FIG. 4, the additional information regarding the members may be as illustrated in FIG. 6, and the location information of the pop-ups may be as illustrated in FIG. 9.

The information extraction unit 1550 extracts various types of information stored in the storage 1540 and transmits the information to the control unit 1530 and the pop-up generation unit 1560.

The pop-up generation unit 1560 generates a translucent pop-up to be displayed on the display unit 1520, by control of the control unit 1530 based on the additional information regarding the members.

Operations of the apparatus 1500 will now be described.

If the GUI 200 illustrated in FIG. 2 is displayed on the display unit 1520, a touch input for selecting an option on the GUI 200 is received by the input unit 1510. If a setup value of a translucent help mode stored in the storage 1540 is activated, the information extraction unit 1550 extracts additional information regarding the selected option, from the storage 1540. The extracted additional information is transmitted to the control unit 1530 and the pop-up generation unit 1560. The pop-up generation unit 1560 generates a pop-up including the extracted additional information by control of the control unit 1530 and transmits the generated pop-up to the display unit 1520. The display unit 1520 displays the transmitted pop-up.

For example, in the "Original Type" function of the GUI 200, if the "Text" icon on the input unit 1510 is touched, the "Text" icon is selected. The information extraction unit 1550 extracts a help content, i.e., additional information regarding the "Text" icon. If the "Text" icon corresponds to the button 1 illustrated in FIG. 6, the extracted help content displays a statement stating that "This function optimizes an image based on text". The information extraction unit 1550 transmits the extracted help content to the control unit 1530 and the pop-up generation unit 1560. The pop-up generation unit 1560 generates a translucent pop-up including the extracted help content by control of the control unit 1530 and transmits the generated translucent pop-up to the display unit 1520. The display unit 1520 displays the transmitted translucent pop-up.

If a touch input for selecting an option located in a region of the displayed translucent pop-up is received, the information extraction unit 1550 extracts additional information regarding the selected option. If the extracted additional information is transmitted to the pop-up generation unit 1560 and then a translucent pop-up including the extracted additional information is generated by the pop-up generation unit 1560, the generated translucent pop-up is displayed on the display unit 1520. In this case, the already displayed translucent pop-up may be closed to display the new translucent pop-up.

Otherwise, if a touch input for selecting a region where an option is not located in the region of the displayed translucent pop-up is received, the display unit 1520 closes the displayed translucent pop-up.

Accordingly, a user may display a translucent pop-up including additional information regarding an option located in a region of an already displayed translucent pop-up without manually closing the already displayed translucent pop-up.

Meanwhile, embodiments can be written as computer programs and can be implemented in general-use digital computers that execute the programs using a computer readable recording medium. Also, the data structure used in the embodiments described above can be recorded on a computer readable recording medium via various means. Examples of the computer readable recording medium include magnetic storage media (e.g., ROM, floppy disks, hard disks, etc.), optical recording media (e.g., CD-ROMs, or DVDs), etc.

While the present embodiment has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the embodiment.

What is claimed is:

1. A method of displaying a translucent pop-up including additional information corresponding to information selected on a touch screen, the method comprising:
   receiving a first touch input to select first information on the touch screen;
   displaying a first translucent pop-up comprising first additional information corresponding to the first information on a first software keyboard;
   receiving a second touch input to select second information located in a region of the first translucent pop-up, on the touch screen; and
   displaying a second translucent pop-up comprising second additional information corresponding to the second information on the software keyboard,
   wherein the second information is seen through the first translucent pop-up, but not included in the first additional information,
   wherein the first translucent pop-up and the second translucent pop-up is translucent with regard to the software keyboard
   wherein a character on the software keyboard is selectable through the first translucent pop-up without first activating the software keyboard; and
   wherein the displaying of the first translucent pop-up comprises:
   displaying a plurality of letters sequentially inputted on the software keyboard in the first translucent pop-up.

2. The method of claim 1, wherein the first information and the second information are options that are selectable on the GUI displayed on the touch screen.

3. The method of claim 2, wherein the first additional information and the second additional information are respectively detailed descriptions regarding the first information and the second information.

4. The method of claim 1, wherein the first information and the second information include a plurality of letters of a software keyboard displayed on the touch screen.

5. The method of claim 4, wherein the first additional information and the second additional information include a plurality of letters of the software keyboard corresponding to the first information and the second information.

6. The method of claim 4, wherein a character on the software keyboard is selectable through at least one: of the first translucent pop-up and the second translucent pop-up without first activating the software keyboard.

7. The method of claim 1, wherein the displaying of the second translucent pop-up comprises:
closing the displayed first translucent pop-up; and
displaying the second translucent pop-up.

8. The method of claim 1, further comprising closing the displayed first translucent pop-up if a third touch input that does not select any option in the region of the first translucent pop-up is received on the touch screen.

9. The method of claim 1, wherein the displaying of the first translucent pop-up and the displaying of the second translucent pop-up are performed only when a translucent help mode is set.

10. An apparatus for displaying a translucent pop-up including additional information corresponding to information selected on a touch screen, the apparatus comprising:
a display unit to display a graphical user interface (GUI) and a translucent pop-up on the software keyboard;
an input unit to receive a first touch input for selecting first information and a second touch input to select second information located in a region of the displayed translucent pop-up, on the displayed GUI;
a storage to store additional information corresponding to each of a plurality of types of information;
an information extraction unit to extract first additional information corresponding to the selected first information and second additional information corresponding to the selected second information, from the storage;
a translucent pop-up generation unit to generate a first translucent pop-up comprising the extracted first additional information and a second translucent pop-up comprising the extracted second additional information; and
a control unit to control the display unit to display the generated first and second translucent pop-ups,
wherein the second information is seen through the first translucent pop-up, but not included in the first additional information,
wherein the first translucent pop-up and the second pop-up are translucent with regard to the software keyboard,
wherein a character on the software keyboard is selectable through at the first translucent pop up without first activating the software keyboard,
wherein the control unit controls the display unit to display a plurality of letters sequentially inputted on the software keyboard in the first translucent pop-up.

11. The apparatus of claim 10, wherein the first information and the second information are options that are selectable on the displayed GUI.

12. The apparatus of claim 11, wherein the first additional information and the second additional information are respectively detailed descriptions regarding the first information and the second information.

13. The apparatus of claim 10, wherein, if the displayed GUI is a software keyboard, the first information and the second information include a plurality of letters of the software keyboard.

14. The apparatus of claim 10, wherein the first additional information and the second additional information are a plurality of letters of the software keyboard corresponding to the first information and second information.

15. The apparatus of claim 13, wherein a character on the software keyboard is selectable through at least one: of the first translucent pop-up and the second translucent pop-up without first activating the software keyboard.

16. The apparatus of claim 10, wherein the control unit controls the display unit to close the displayed first translucent pop-up and to display the second translucent pop-up.

17. The apparatus of claim 10, wherein the control unit controls the display unit to close the first translucent pop-up displayed on the display unit if the input unit receives a third touch input that does not select any option in the region of the first translucent pop-up.

18. The apparatus of claim 10, wherein the control unit controls the display unit to display the first translucent pop-up and to display the second translucent pop-up only when a translucent help mode is set.

* * * * *